US012785511B2

(12) United States Patent
Andessner et al.

(10) Patent No.: US 12,785,511 B2
(45) Date of Patent: Nov. 3, 2026

(54) AXIAL FLUX MACHINE WITH STATOR AND ANNULAR STRUCTURAL ELEMENT AS A COOLING ELEMENT EXTENDING INTO STATOR GROOVE

(71) Applicant: WEBER-HYDRAULIK GMBH, Güglingen (DE)

(72) Inventors: Dietmar Andessner, Offenhausen (AT); Philipp Lucas Fruehwirth, Kirchham (AT)

(73) Assignee: WEBER-HYDRAULIK GMBH, Güglingen (DE)

( * ) Notice: Subject to any disclaimer, the term of this patent is extended or adjusted under 35 U.S.C. 154(b) by 235 days.

(21) Appl. No.: 18/698,904

(22) PCT Filed: Oct. 5, 2022

(86) PCT No.: PCT/AT2022/060348

§ 371 (c)(1),
(2) Date: Apr. 5, 2024

(87) PCT Pub. No.: WO2023/056496

PCT Pub. Date: Apr. 13, 2023

(65) Prior Publication Data

US 2025/0007355 A1 Jan. 2, 2025

(30) Foreign Application Priority Data

Oct. 7, 2021 (AT) ............................... A50802/2021

(51) Int. Cl.
*H02K 9/22* (2006.01)
*H02K 1/14* (2006.01)
(Continued)

(52) U.S. Cl.
CPC ............. *H02K 9/225* (2021.01); *H02K 1/146* (2013.01); *H02K 9/20* (2013.01); *H02K 21/24* (2013.01)

(58) Field of Classification Search
CPC ............ H02K 9/20; H02K 9/22; H02K 9/223; H02K 9/225; H02K 9/227; H02K 3/28;
(Continued)

(56) References Cited

U.S. PATENT DOCUMENTS 5,945,759 A * 8/1999 Tanaka ..................... H02K 5/24 310/90
6,252,321 B1 * 6/2001 Fisher .................. H02K 5/1672 310/90
(Continued)

FOREIGN PATENT DOCUMENTS

DE 10 2019 000 666 A1 8/2019
JP S60-128838 A 7/1985
(Continued)

OTHER PUBLICATIONS

Thermal Conductivity.*
International Search Report in PCT/AT2022/060348, mailed Feb. 15, 2023.

*Primary Examiner* — Maged M Almawri
(74) *Attorney, Agent, or Firm* — Collard & Roe, P.C.

(57) ABSTRACT

An axial flux machine has a motor housing and at least two active parts, of which at least one active part is configured as a rotor which has a number of permanent magnets and is mounted rotatably about a rotational rotor axis, and a stator is the second active part. The stator has a stator yoke, a number of stator teeth and coils arranged around the stator teeth, and an annular structural element for cooling the stator is arranged on the stator and is connected in a rotation-proof manner to the stator yoke and, as a cooling element, extends at least partially into the stator groove of at least one of the
(Continued)

Figure 1:
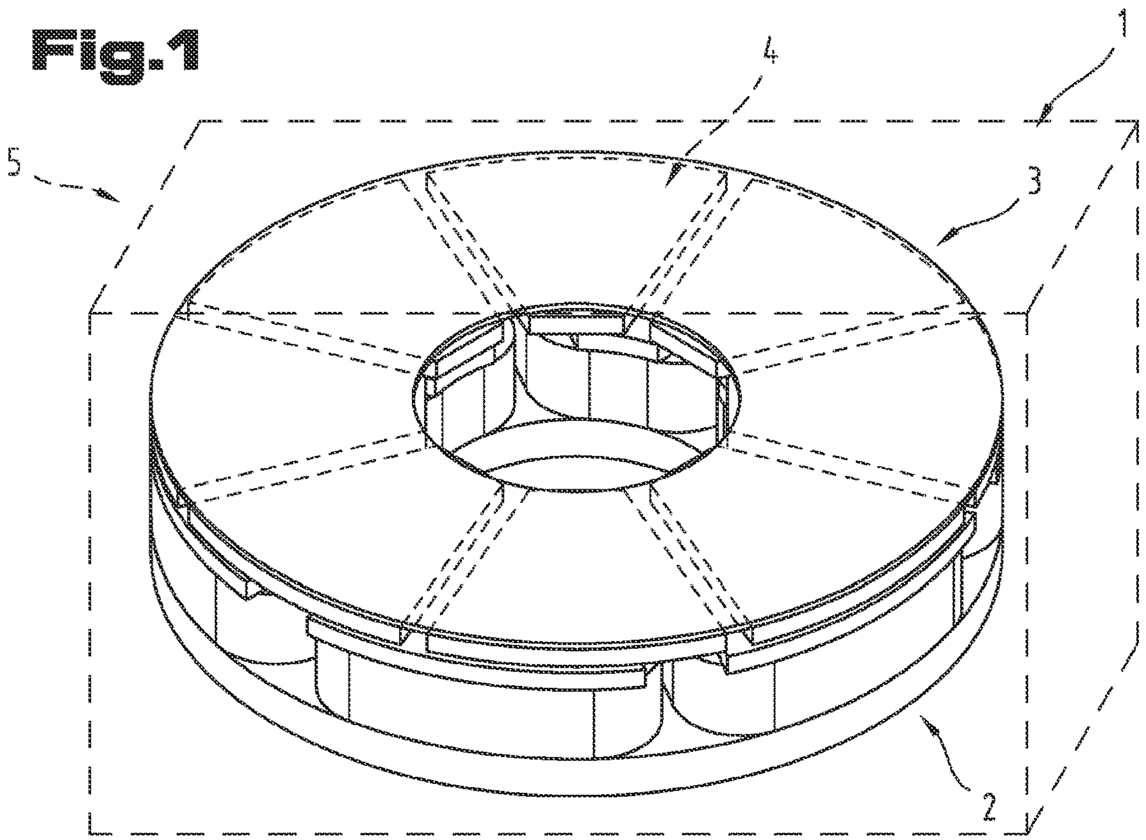

stator teeth and projects at least partially beyond the stator yoke at the outer and/or inner diameter of the stator.

20 Claims, 7 Drawing Sheets

(51) Int. Cl.
*H02K 9/20* (2006.01)
*H02K 21/24* (2006.01)

(58) Field of Classification Search
CPC ............ H02K 3/46; H02K 3/26; H02K 1/182; H02K 1/2793; H02K 21/24
USPC ............................................................ 310/54
See application file for complete search history.

(56) References Cited

U.S. PATENT DOCUMENTS

| | | | | | |
|---|---|---|---|---|---|
| RE37,844 | E * | 9/2002 | Pullen | H02K 3/47 | 310/58 |
| 8,330,309 | B2 * | 12/2012 | Perret | H02K 5/15 | 310/90 |
| 9,154,020 | B2 | 10/2015 | Deguchi et al. | | |
| 10,418,889 | B2 * | 9/2019 | Thiele | H02K 1/146 | |
| 10,541,591 | B2 * | 1/2020 | Patterson | H02K 1/146 | |
| 10,819,169 | B2 * | 10/2020 | Ogawa | H02K 1/182 | |
| 10,886,796 | B2 | 1/2021 | Stetina et al. | | |
| 11,594,929 | B2 * | 2/2023 | Yao | H02K 3/28 | |
| 11,804,763 | B2 * | 10/2023 | Maruyama | H02K 1/148 | |
| 2011/0316381 | A1 * | 12/2011 | Asano | H02K 1/182 | 310/216.045 |
| 2012/0086303 | A1 * | 4/2012 | Hsu | H02K 1/182 | 310/216.113 |
| 2013/0147291 | A1 * | 6/2013 | Woolmer | H02K 5/203 | 310/58 |
| 2013/0270945 | A1 * | 10/2013 | Ziegler | F16C 41/02 | 310/90 |
| 2014/0009009 | A1 * | 1/2014 | Deguchi | H02K 11/40 | 310/43 |
| 2019/0165634 | A1 * | 5/2019 | Whaley | H02K 1/182 | |
| 2020/0373817 | A1 * | 11/2020 | Yan | H02K 11/215 | |
| 2022/0278579 | A1 * | 9/2022 | Bossecker | H02K 1/182 | |
| 2022/0368202 | A1 * | 11/2022 | Bossecker | H02K 5/20 | |
| 2023/0009136 | A1 * | 1/2023 | Witt | H02K 16/02 | |
| 2023/0327531 | A1 * | 10/2023 | Tangudu | H02K 1/12 | 310/66 |
| 2025/0112528 | A1 * | 4/2025 | Anvari | H02K 9/223 | |

FOREIGN PATENT DOCUMENTS

| | | | |
|---|---|---|---|
| JP | 2006-042535 | A | 2/2006 |
| WO | 2015/075784 | A1 | 5/2015 |
| WO | 2019/171318 | A1 | 9/2019 |
| WO | 2021/003509 | A1 | 1/2021 |
| WO | 2021/003510 | A2 | 1/2021 |

* cited by examiner

AXIAL FLUX MACHINE WITH STATOR AND ANNULAR STRUCTURAL ELEMENT AS A COOLING ELEMENT EXTENDING INTO STATOR GROOVE

CROSS REFERENCE TO RELATED APPLICATIONS

This application is the National Stage of PCT/AT2022/060348 filed on Oct. 5, 2022, which claims priority under 35 U.S.C. § 119 of Austrian Application No. A50802/2021 filed on Oct. 7, 2021, the disclosure of which is incorporated by reference. The international application under PCT article 21(2) was not published in English.

The invention relates to an axial flux machine with a motor housing and at least two active parts, of which at least one active part is configured as a rotor which has a number of permanent magnets and is mounted in the motor housing so as to be rotatable about a rotational rotor axis, and a stator is provided as a second active part, wherein the stator has a stator yoke, a number of stator teeth and coils arranged around the stator teeth.

Various designs of axial flux machines are known from the prior art. For example, publications WO2021003509A1 and DE102019000666A1 disclose axial flux machines in the configuration with one or multiple stators, stator backstops and one or multiple rotors.

Cooling solutions for a stator, which have suitable cooling channels or cooling hoses for liquid cooling of the stator, are known from publications JP2006042535 and WO2019171318A1. In practice, this technical solution proves to be technically complicated and prone to errors.

An induction motor with a cooling body is known from publication JPS60128838. This is a special design of a cooling body which has proven unsuitable in practice for a permanently excited axial flux machine.

In the publication U.S. Pat. No. 9,154,020B2, a design of an axial flux motor without a stator yoke is shown. An earthing plate is used for electrical earthing of the stator cores. This technical solution is not applicable to an axial flux machine with a stator yoke.

In connection with the heat generated during operation of an axial flux machine, it is a technical problem known from the prior art that excessive heat generation and thus heating of the stator leads to an impairment of the performance of such a machine. In addition, excessive heat generation can lead to damage to individual components of the axial flux machine.

Therefore, based on the prior art, the person skilled in the art is faced with the object of developing a high-performance axial flux machine according to the preamble of claim 1.

This technical object is achieved by the characterizing part of claim 1.

According to an embodiment of the invention, an axial flux machine is provided with a motor housing and at least two active parts, of which at least one active part is configured as a rotor which has a number of permanent magnets and is mounted in the motor housing so as to be rotatable about a rotational rotor axis. In this regard, at least one stator is provided as a second active part, wherein the stator has a stator yoke, a number of stator teeth and coils arranged around the stator teeth. Furthermore, an annular structural element, which is arranged on the stator and connected to the stator yoke in a rotation-proof manner, is provided for cooling the stator. The annular structural element extends as a cooling element at least partially into the stator groove of at least one of the stator teeth and projects at least partially beyond the stator yoke on the outer and/or inner diameter of the stator.

By definition, the stator groove is understood to be the cavity and/or recess between two stator teeth, in which the winding and/or the electrical insulation is typically accommodated.

In this regard, the windings arranged in this cavity are wound around the stator tooth. The annular structural element is at least partially accommodated in this recess, preferably below the winding, particularly preferably between the winding and the stator yoke. This adjacent arrangement ensures particularly effective cooling of the stator and/or, in particular, of the winding. Because the annular structural element protrudes at least partially beyond the stator yoke, the structural element has a large cooling surface and can therefore be used effectively to cool the stator. The structural element has a suitable size, whereby it acts at least partially as a structurally supporting element and thus supports and stabilizes the structure of the stator and/or the components of the stator and/or the axial flux machine.

According to an embodiment of the invention, the majority, in particular more than 60%, preferably more than 80%, of the load forces and load torques occurring at the stator are introduced into the motor housing via the annular structural element.

The cooling solutions known from the prior art do not have a load-bearing function and are not suitable for fastening the stator to the motor housing.

According to a possible embodiment of the invention, the annular structural element has at least partial electrical insulation, for example at least partial anodization of the surface of the structural element.

According to a possible embodiment of the invention, forces and torques can be introduced from the stator into the housing via a screw connection and/or a positive and/or force-fit connection between the annular structural element and the motor housing. According to a particular embodiment, this feature allows the motor torques and motor forces of the stator to be introduced into the housing predominantly via the structural element.

According to a particular embodiment of the invention, the annular structural element is configured as a positioning element at its outer and/or inner edge, so that the stator can be positioned via the annular structural element, in particular in the motor housing and/or an injection molding tool for overmolding at least a part of the stator.

Another technical problem is the required precise positioning of the components of the axial flux machine. In order to realize an efficient axial flux machine, the air gap between the stator and rotor must be adjusted with high precision. Such an adjustment must be technically simple and reliable and presents the person skilled in the art with particular technical challenges with regard to the tolerance chain that determines the air gap, especially in the industrial production of an axial flux machine. By definition, the air gap is the gap between rotating and stationary components, for example between the stator and rotor. In order to develop a cost-efficient machine, this gap should be as small as possible. According to an embodiment of the invention, the annular structural element can be configured in such a way that it serves as a positioning aid during installation of the stator and/or assembly and/or installation of the axial flux machine.

According to a further embodiment of the invention, it is also possible to use the annular structural element as a positioning element in a manufacturing and/or assembly step. For example, when overmolding the stator, in particular with a thermoplastic material, it is possible to align and/or position the stator via the annular structural element, for example in an injection mold of a suitable injection molding machine.

According to a particular embodiment of the invention, the annular structural element has suitable fastening elements via which the stator can be fastened in the motor housing via the annular structural element.

Attachment to the motor housing is possible in the region of the inner or outer edge of the structural element.

According to a particular embodiment, the stator is attached for example to the motor housing via the structural element. For example, corresponding fastening lugs are provided on the structural element via which the stator is fastened to the motor housing.

According to a particular embodiment of the invention, the structural element can, for example, take over the rotor bearing so that the rotor no longer has to be mounted in the motor housing.

According to a particular embodiment of the invention, a bearing seat, in particular for rolling bearings, is provided on the structural element, via which the position of the rotational rotor axis is defined and/or axial forces, in particular of the rotor, can be absorbed.

According to a particular embodiment of the invention, axial forces and/or, according to a further embodiment, also radial forces are transmitted from the stator to the motor housing and/or a suitable bearing location at the bearing.

According to a particular embodiment of the invention, the stator yoke and the stator teeth are configured as a one-piece component.

According to a particular embodiment of the invention, the annular structural element has a thermal conductivity of at least 45 W/mK, preferably of at least 150 W/mK, particularly preferred of at least 220 W/mK.

According to a particular embodiment of the invention, the annular structural element consists at least partially of aluminum, steel, copper, magnesium, brass, zinc, carbon and/or metal oxides (ceramics).

According to a particular embodiment of the invention, the annular structural element has recesses and/or openings which are suitable for the passage of electrical conductors, coolants or fastenings and/or for reducing eddy-current losses.

According to a particular embodiment of the invention, the annular structural element encloses the individual stator teeth, wherein at at least one point of the enclosure of at least one stator tooth, in particular of each stator tooth, the enclosure is open, at least in the form of a slot.

According to an embodiment of the invention, this measure can reduce and/or prevent eddy currents and/or other power losses of the stator.

According to a particular embodiment of the invention, the annular structural element is at least partially formed by a sheet metal strip, which is preferably guided around the stator teeth in a meandering manner.

According to this particular embodiment, electrical power losses, in particular eddy currents, can be efficiently prevented and the production can be made particularly efficient and material-saving and/or waste-avoiding.

According to a particular embodiment of the invention, the annular structural element has a heat transfer device, in particular a closed cavity with a medium with phase transition and/or a heat pipe, in particular inserted in a positive locking manner, with an integrated working medium.

According to this embodiment of the invention, the cooling of the stator can be further improved.

According to a particular embodiment of the invention, the annular structural element has at least one projection in the radial and/or axial direction, by means of which the cooling capacity of the annular structural element can be increased.

According to this particular embodiment, the cooling performance of the annular structural element can be further improved.

According to a particular embodiment of the invention, the at least one projection has a cooling fin, in particular a tab-shaped cooling fin, preferably produced by stamping or molding from the annular structural element, which cooling fin is arranged adjacent to at least one of the coils.

The invention is explained by way of example below with reference to schematic drawings in various possible, non-limiting embodiments. These show:

FIG. 1 a general schematic view of an axial flux machine

Figure 2:
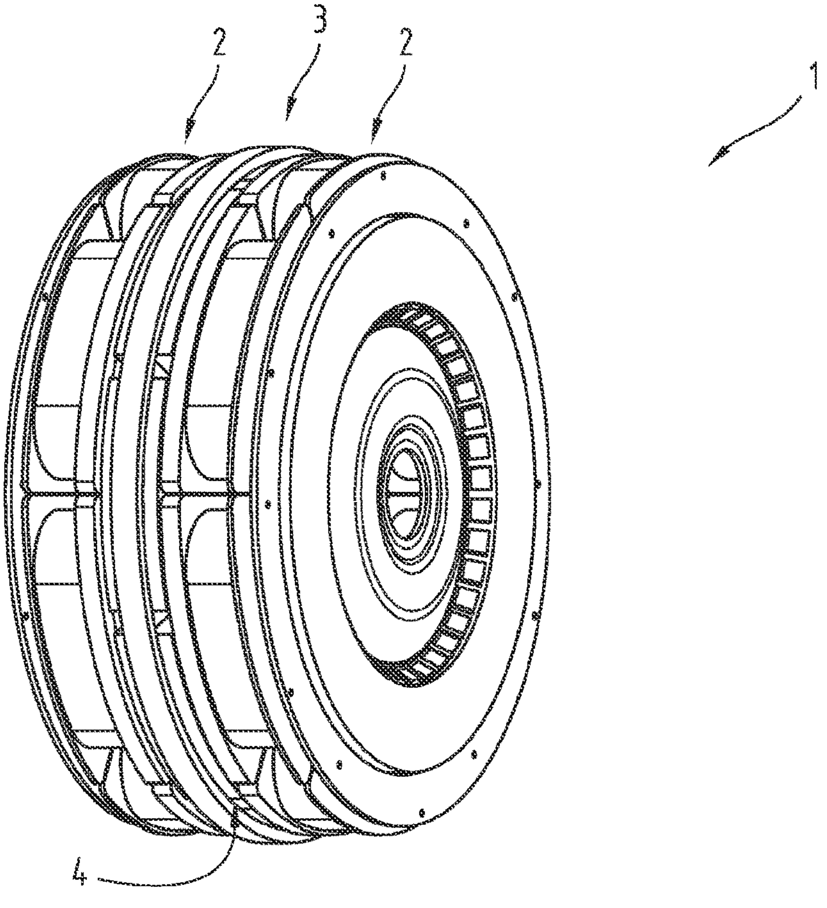

FIG. 2 a further general schematic view of an axial flux machine

Figure 3:
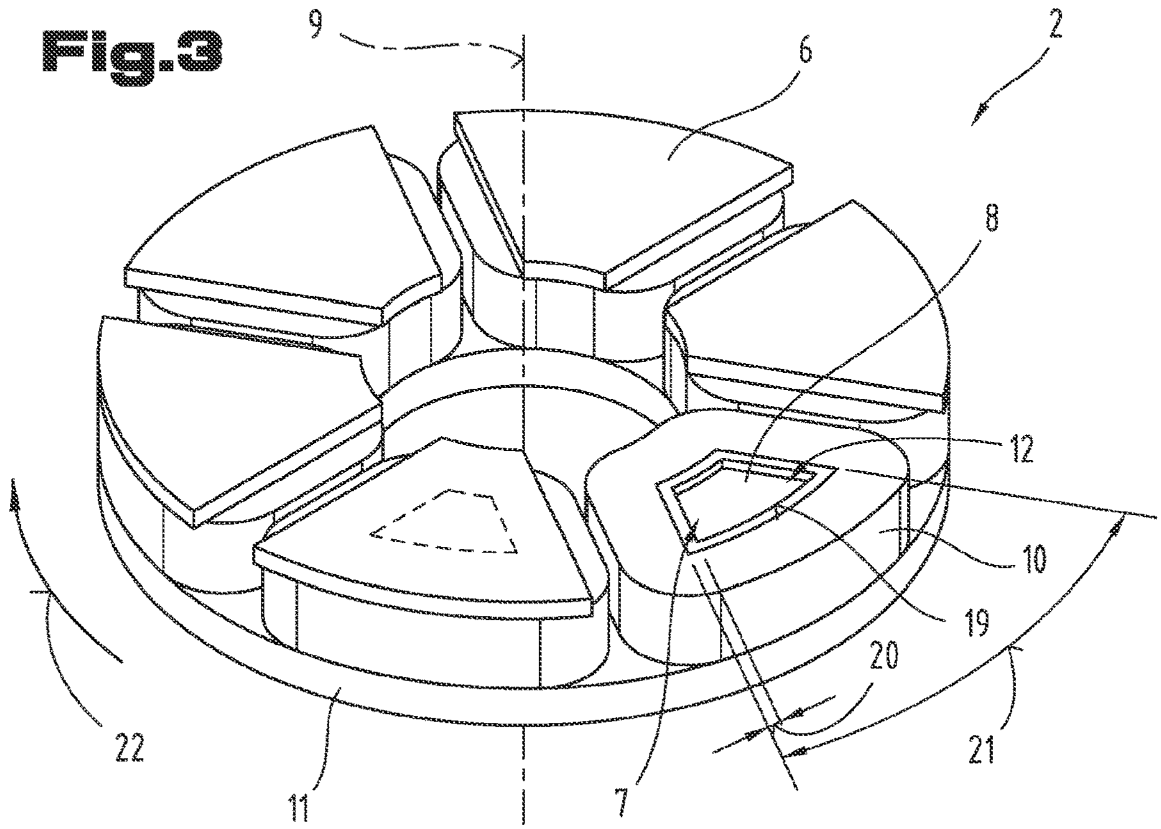

FIG. 3 a schematic view of a detail of a stator of an axial flux machine

Figure 4:
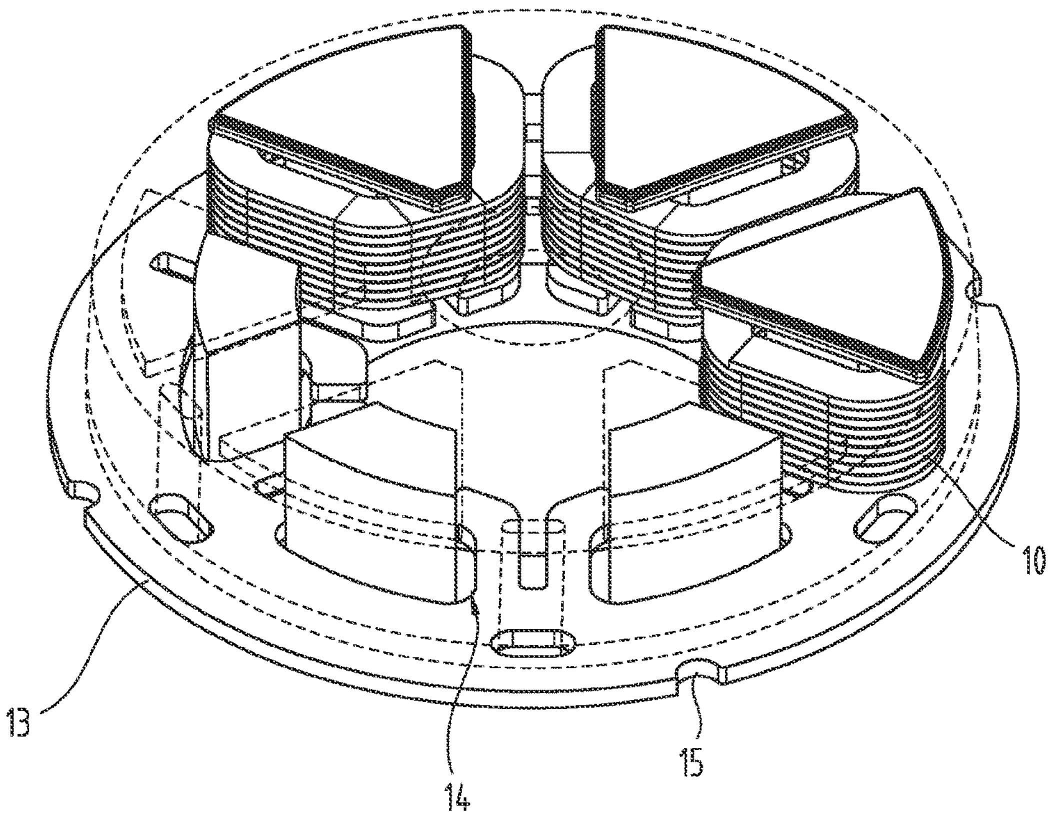
Figure 5:
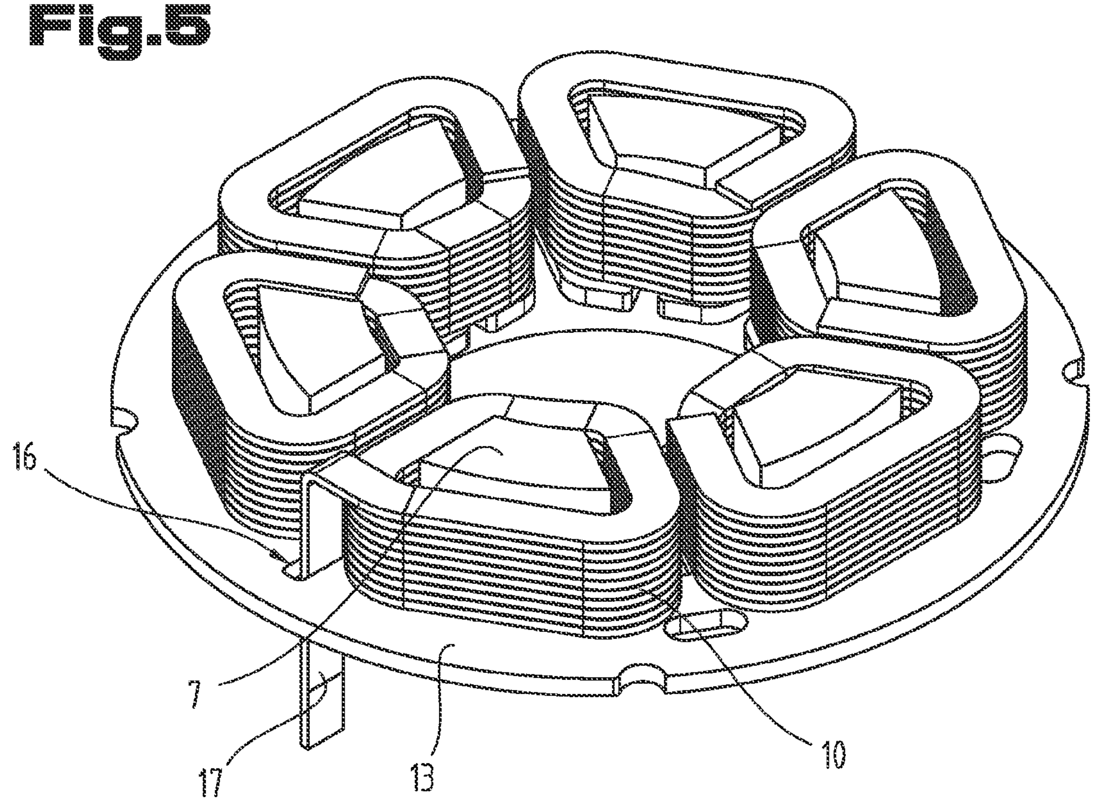
Figure 6:
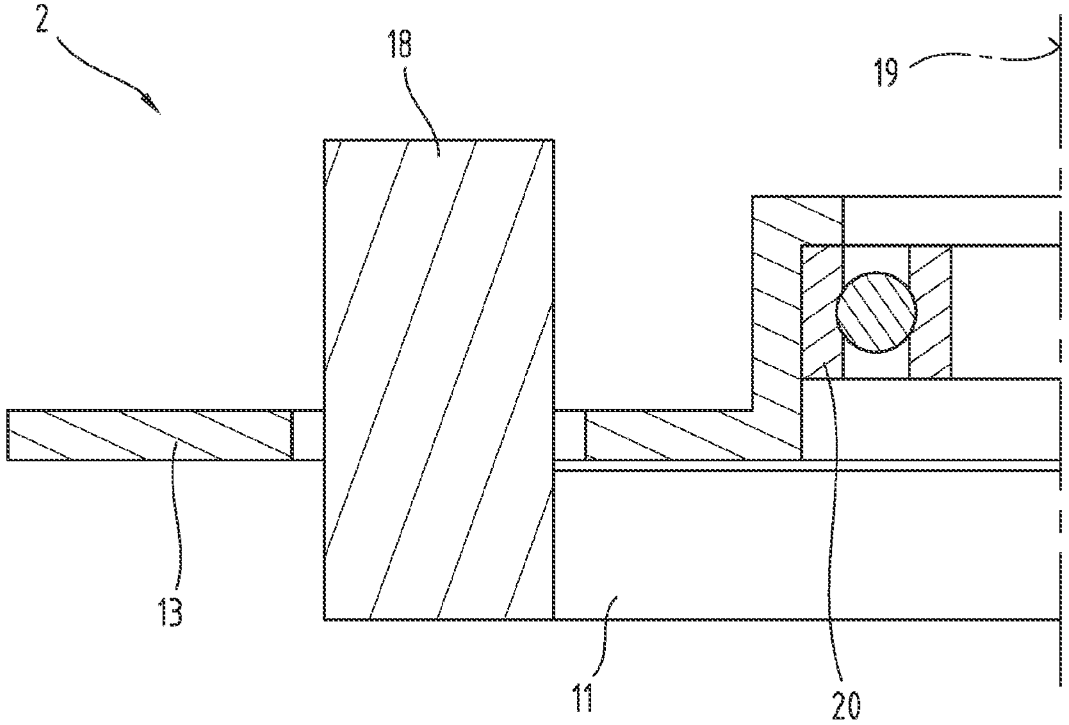
Figure 7:
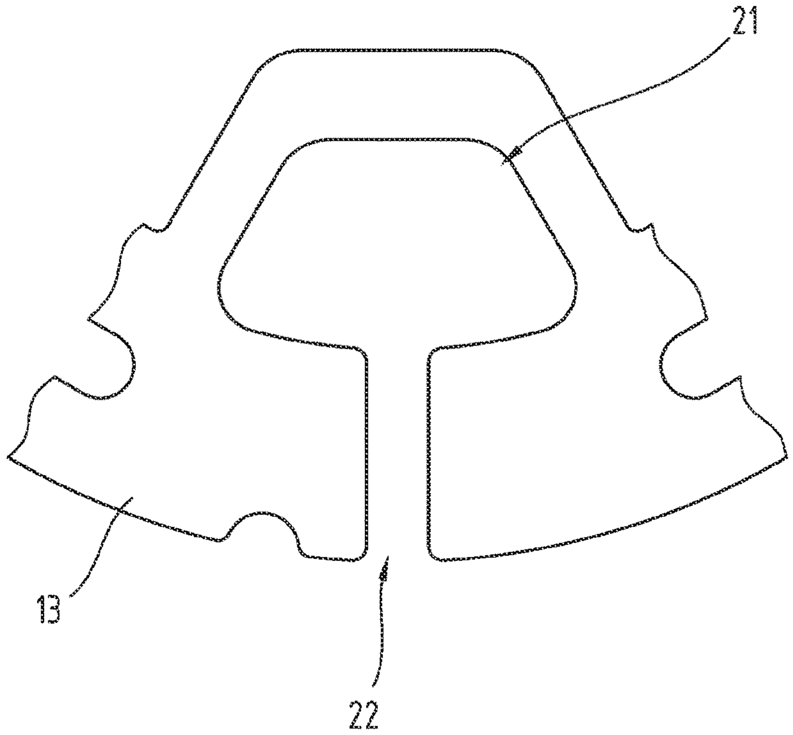
Figure 8:
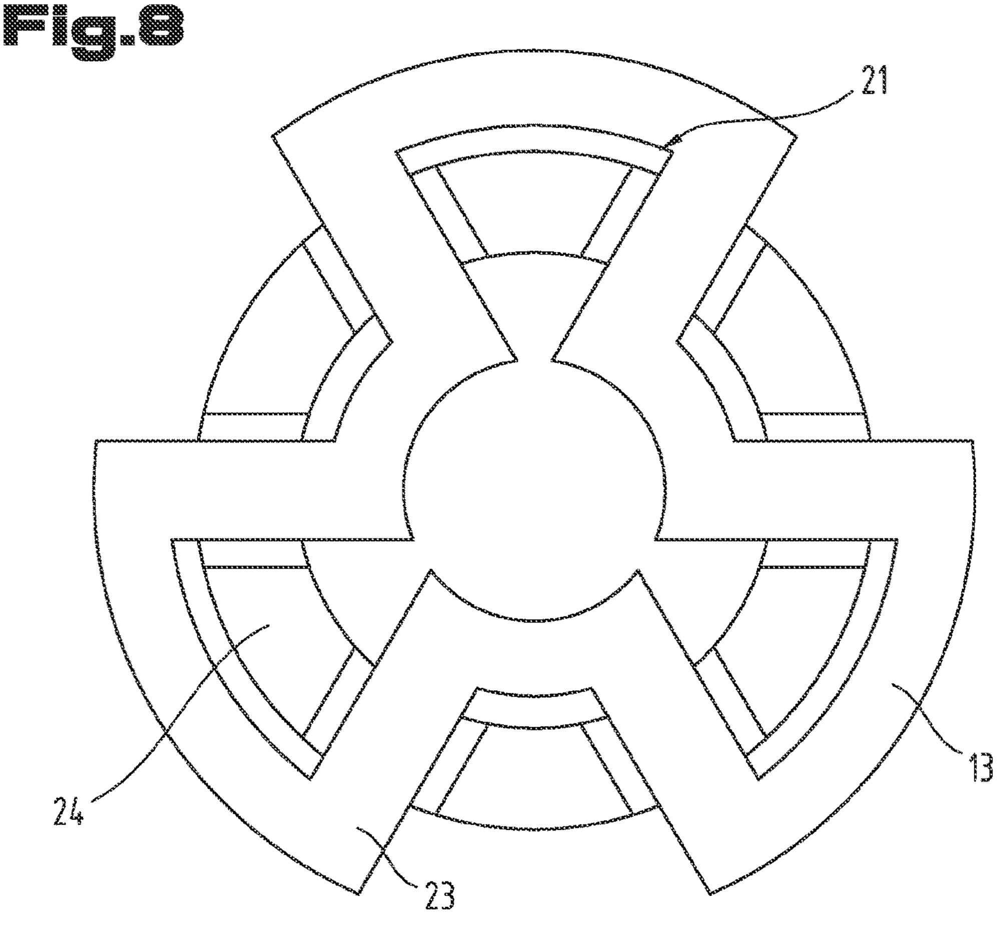
Figure 9:
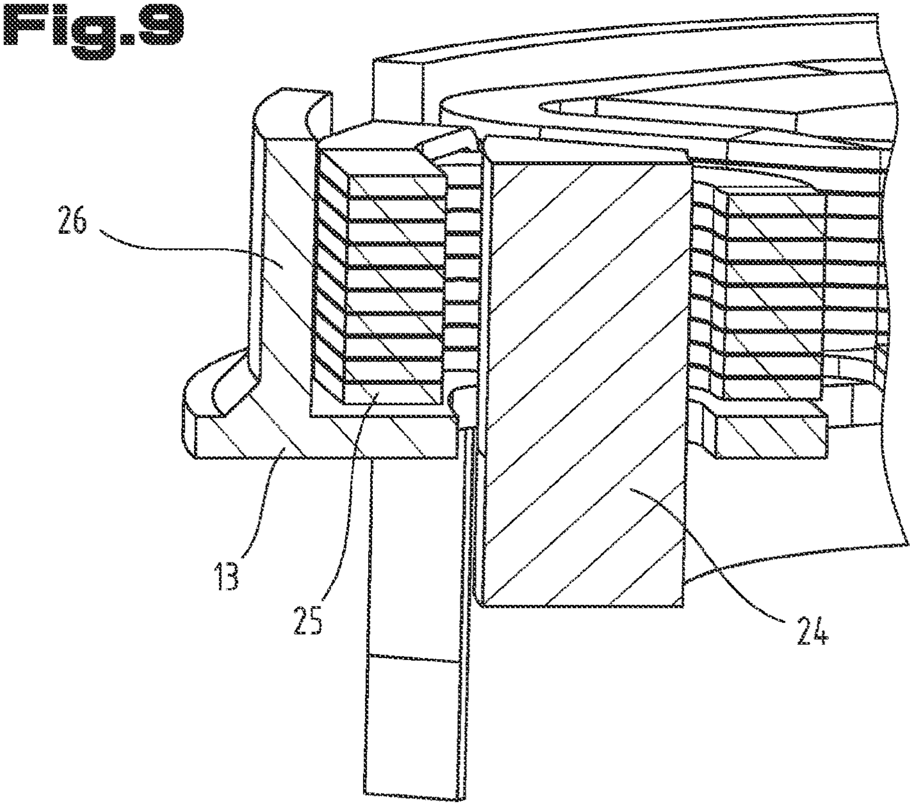
Figure 10:
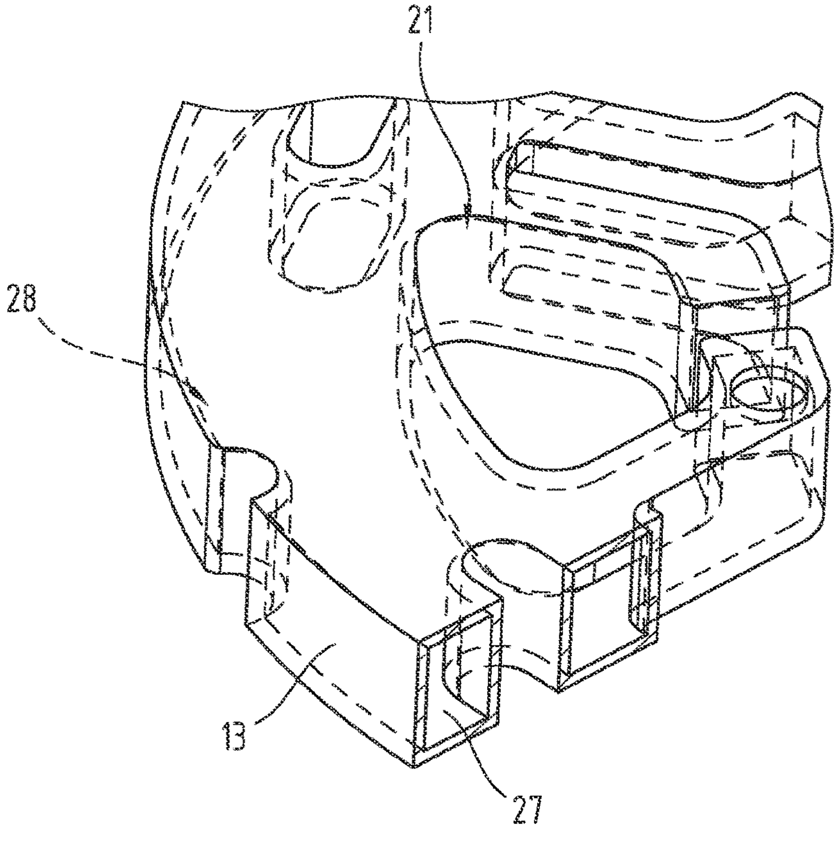
Figure 11:
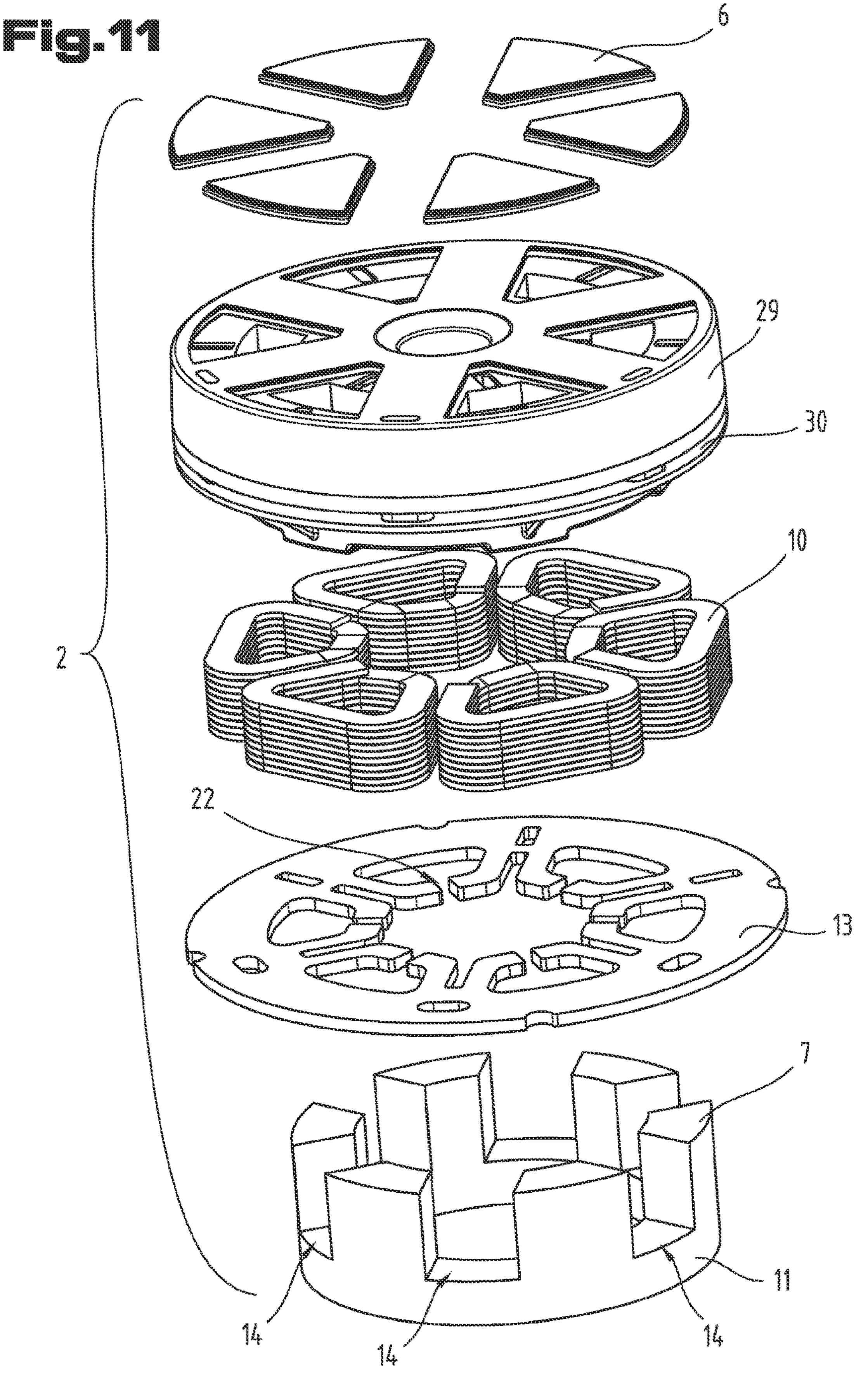
Figure 12:
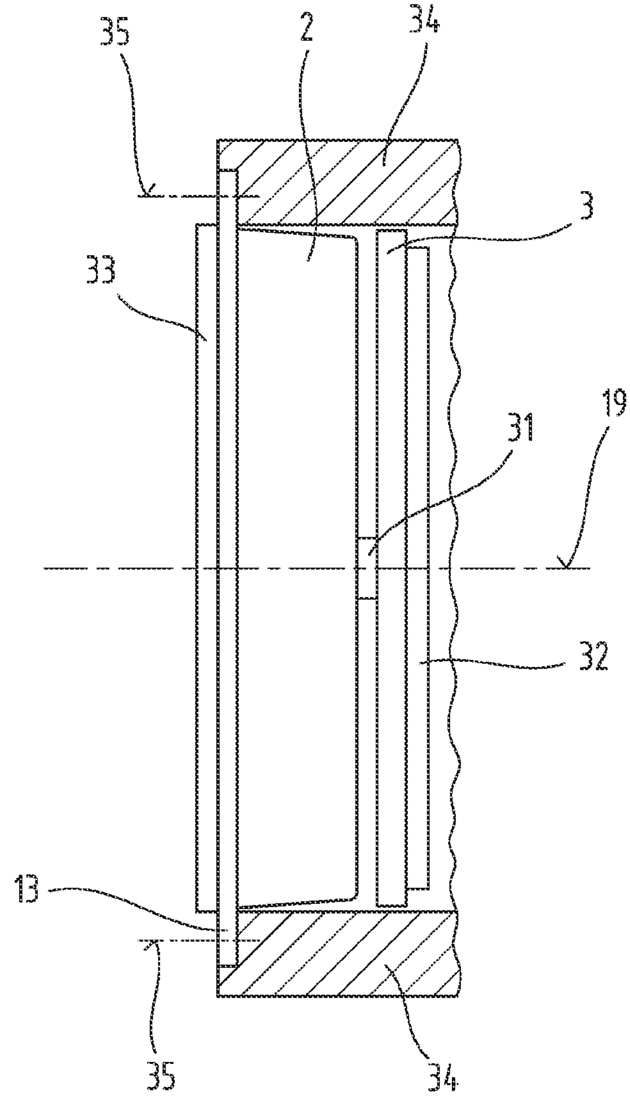

FIG. 4 a schematic view of a stator with an embodiment of an annular structural element FIG. 5 a schematic view of windings of a stator of an axial flux machine with a possible embodiment of a structural element according to the invention FIG. 6 a partial view of a section through a stator in a schematic view with a further possible embodiment of a structural element according to the invention FIG. 7 an exemplary top view of an annular structural element in an exemplary embodiment FIG. 8 a further view of an exemplary annular structural element with an exemplary embodiment of stator teeth and a return FIG. 9 a further partial view of a section through an exemplary stator in a schematic view FIG. 10 a further partial view of a section through an exemplary structural element in a schematic view FIG. 11 an isometric view of the stator in an exploded view FIG. 12 a schematic view of the installation situation of an axial flux machine in a motor housing The disclosure of publication WO2021003510A2 of the applicant is hereby incorporated in its entirety into the disclosure of the present application.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure. These specifications of location are to be transferred to the new position accordingly when the position is changed.

FIG. 1 shows a first embodiment variant of an axial flux machine 1 comprising at least one stator 2 and at least one rotor 3. According to other possible embodiments (not shown), arrangements with multiple rotors are possible, between each of which, for example, a stator is arranged.

Magnets 4, for example permanent magnets, are arranged on the rotor 3 or the rotors 3. The at least one stator 2 and the at least one rotor 3 can be arranged in an optionally present motor housing 5, as indicated by a dashed line in FIG. 1.

Several stators 2 can also be arranged. In this case, preferably all stators 2 are of the same design, so that the following explanations can also be applied to any other stators 2 that may be present. For example, FIG. 2 shows an embodiment variant of the axial flux machine 1 in which only one rotor 3 is arranged. The rotor 3—as viewed in the axial direction—is arranged between two stators 2, which are configured according to the invention. The rotor 3 is equipped with multiple magnets 4 (permanent magnets) on both sides. The two stators 2 are arranged in such a way that return elements and/or a stator yoke are each arranged on the side of the stator 2 facing away from the rotor 3.

FIG. 3 shows another possible embodiment variant of a stator 2 for an axial flux machine 1. The stator 2 has multiple stator teeth 7. The stator teeth 7 each have a tooth body 8. Furthermore, the stator teeth 7 in an axial direction 9 have opposite end sections, which form a tooth head and a tooth root. The stator teeth 7 are each wrapped with a coil winding 10 (only indicated schematically in FIG. 3). The tooth bodies 8 rest in the axial direction 9 on an, in particular plate-shaped, return element 11 or are at least partially inserted into the return element 11, for which purpose the return element has corresponding recesses in which the tooth bodies 8 are preferably positively received. The return element 11 is preferably formed in one piece. According to a further embodiment, the return element 11 is preferably formed in one piece with the stator teeth 7. According to a further possible embodiment, the return element 11 is wound from an electrical sheet.

At least between the coil winding 10 and the tooth body 8, according to a possible embodiment, an electrical insulation not shown in further detail is arranged. The number of stator teeth 7 shown in the figures is not to be understood as limiting. Rather, their number depends on the respective conditions in the use of the stator 2 and/or the axial flux machine 1 according to the desired performance characteristics of the application.

The stator teeth 7 are evenly distributed around the circumference of the stator 2. In particular, they have an at least approximately trapezoidal cross-sectional area when viewed in the axial direction 9.

In FIG. 3, flux collecting elements 6 are shown and/or have been removed at one point to allow a better view of the stator teeth 7.

The, in particular annular, return element 11 of the stator 2 can be made of a material commonly used for this purpose. According to a particular embodiment, the stator teeth can be made in one piece with the stator return 11, which is also referred to as the stator yoke by the person skilled in the art.

FIG. 4 shows a further schematic embodiment of an exemplary embodiment. It shows the annular structural element 13 which, as shown in the drawing, extends into the stator grooves 14 between the stator yoke 11 and the coil winding 10.

As can also be seen in FIG. 4, the annular structural element 13 extends radially beyond the stator yoke and shows corresponding openings and/or partial openings 15 on the outer diameter, via which the annular structural element can be positioned and/or fastened, for example as a load-bearing element with another part, such as the motor housing 1.

According to a particular embodiment, the stator 3 can be overmolded as a whole with a thermoplastic material and/or a thermosetting material. According to a particular embodiment, in this regard, the annular structural element 13, in particular at its outer periphery and/or diameter, can be used as a stop in an injection molding tool, whereby a defined size and position of the overmolded shell of the stator can be better achieved.

In FIG. 5, the annular structural element 13 is shown according to a further possible embodiment, with stator teeth 7 (only one stator tooth is labeled for better clarity) and with coils 10 (only one coil is labeled for better clarity). It can be seen from this schematic representation that the annular structural element 13 has suitable openings 16 through which the connections 17 of the coils 10 can be guided. According to further embodiments, further openings are provided, for example to prevent eddy currents. The stator teeth 7 are, for example, suitably connected to the stator yoke 11 or, according to a further possible embodiment, are made in one piece with the stator yoke 11 (not shown in detail).

The annular structural element 13 is connected in a rotation-proof manner to the stator yoke 11. This rotation-proof connection can be realized by mechanical elements, for example a screw connection, riveting or in another manner. For example, a bonding or a connection by over-molding the parts of the stator is possible. According to a further particular embodiment, a positive connection between the structural element and the stator yoke is possible.

FIG. 6 shows a detail of a further embodiment of an annular structural element 13 with parts of a stator of an axial flux machine. Here, the person skilled in the art can see, on the one hand, a stator tooth 18 which extends through the annular structural element 13 shown and is connected to the stator yoke 11. On the other hand, the axis of rotation 19 of the rotor and a bearing 20 can be seen on a bearing seat arranged on the structural element. The rotor shaft is thus rotatably mounted in the annular structural element 13. It is possible to transmit axial forces, for example from the rotor shaft to the annular structural element 13, via the bearing 20. According to a particular embodiment, it is thus possible for the structural element to transmit forces and/or torques of the stator and/or rotor into the motor housing.

As can be seen from the schematic drawing, the rotor (not shown) is supported with its rotational rotor axis 19 on the structural element via the bearing 20.

FIG. 7 shows a further detail of the embodiment of the annular structural element 13. In this regard, a part of the structural element 13 can be seen which encloses a stator tooth in the opening 21. As can be seen in the schematic drawing, the structural element 13 has an opening 22, so that the ring around the stator tooth is not closed. This opening, which can of course also be located further inside or to the side, prevents or reduces ring currents and/or eddy-current losses.

In FIG. 8, an annular structural element 13 is configured as a sheet metal part 23. The sheet metal part 23 is guided around stator teeth 24. The sheet metal part can be produced, for example, by punching out or, on the other hand, by a forming process from a sheet metal strip, which is bent in a suitable manner, for example, in order to then be guided around the stator teeth 24 in a meandering shape. In this way, for example, such a structural element 13 can be realized in a very material-saving manner.

FIG. 9 shows a schematic sectional view of a detail of a particular embodiment of an annular structural element 13. The illustration shows how the structural element 13 is arranged in the stator groove below the coil winding 25 and also has a projection 26, in particular in the form of a fin, on the outside of the coil for additional cooling of the coil.

FIG. 10 shows a schematic sectional view of a further detail of a particular embodiment of an annular structural element 13. The annular structural element has a heat transfer device 27, in particular a heat pipe. Such a heat transfer device is a component that can cool an area of a component by utilizing the evaporation energy and/or evaporation heat. Heat pipes are also known in the prior art as two-phase thermosiphons. In the present case, the annular structural element 13 has one or multiple suitable channels 28, wherein the working fluid evaporates at a hot point and condenses at a colder point. By installing such a heat transfer device, the cooling performance of the annular structural element 13 can be further improved.

For a better understanding of the invention, FIG. 11 shows an exploded view of a possible embodiment of a stator 2 of an axial flux machine according to the invention. The corresponding parts of the stator are labeled as described above. FIG. 11 also shows a thermoplastic component 29 which is produced by overmolding, for example by injection molding, the components of the stator and is suitable for suitably protecting the internal components of the stator, in particular the windings 10. According to a possible embodiment, the structural element 13 is integrated into the thermoplastic component 29 in the assembled state of the stator and its edge projects radially out of the opening 30 of the component 29.

To further illustrate a particular embodiment of the invention, the installation situation of an embodiment of an axial flux machine according to the invention is shown schematically in FIG. 12. Parts of the motor housing are shown in section for clarification and parts of the axial flux machine are shown in a side view. In this regard, the axial flux machine is only partially shown for the sake of clarity. The stator 2 and the rotor 3 as well as a rotor shaft 31, which is rotatable about a rotational rotor axis 19 and is connected to the rotor in a rotation-proof manner, as well as a rotor return 32 and a stator yoke 33 are shown. Furthermore, an annular structural element 13 is shown, which is attached to a motor housing 34 via suitable screw connections 35 (not shown in detail). The motor housing is not shown in full in FIG. 12. In particular, a further housing part (not shown) can be provided which, for example, surrounds and/or encloses the stator yoke 33.

The invention claimed is:

1. An axial flux machine having a motor housing and at least two active parts, of which at least one active part is configured as a rotor which has a number of permanent magnets and is mounted rotatably about a rotational rotor axis, and at least one stator is provided as a second active part, wherein the stator has a stator yoke, a number of stator teeth and coils arranged around the stator teeth, wherein an annular structural element which is at least partially provided with electrical insulation is provided for cooling the stator, which annular structural element is arranged on the stator and is connected in a rotation-proof manner to the stator yoke and, on the one hand, extends as a cooling element at least partially into at least one of the stator grooves below at least one of the coils and projects at least partially beyond the stator yoke at the outer and/or inner diameter of the stator and, on the other hand, is configured as a fastening element at its outer and/or inner edge and the stator is fastened in the motor housing via the annular structural element, so that the annular structural element introduces load forces and load torques occurring in the axial flux machine from the stator into the motor housing.

2. The axial flux machine according to claim 1, wherein the stator yoke and the stator teeth are configured as a one-piece component.

3. The axial flux machine according to claim 1, wherein the annular structural element has a thermal conductivity of at least 80 W/mK.

4. The axial flux machine according to claim 1, wherein the annular structural element at least partially comprises aluminum, steel, copper, magnesium, brass, zinc, carbon and/or metal oxides, in particular ceramics.

5. The axial flux machine according to claim 1, wherein the annular structural element has recesses and/or openings which are suitable for the passage of electrical conductors, coolants or fastenings and/or for the reduction of eddy-current losses.

6. The axial flux machine according to claim 1, wherein the annular structural element is formed at least partially by a sheet metal strip which is guided at least partially around the stator teeth.

7. The axial flux machine according to claim 1, wherein the annular structural element is configured as a positioning element at its outer and/or inner edge, so that the stator can be positioned via the annular structural element in the motor housing and/or in an injection molding tool.

8. The axial flux machine according to claim 1, wherein the annular structural element has a thermal conductivity of at least 220 W/mK.

9. The axial flux machine according to claim 1, wherein the annular structural element at least partially comprises ceramics.

10. The axial flux machine according to claim 1, wherein the annular structural element is configured in such a way that the annular structural element encloses the individual stator teeth in an annular manner, wherein at one or more points of the annular enclosure of each stator tooth, this enclosure is perforated by a recess.

11. The axial flux machine according to claim 1, wherein the annular structural element is configured in such a way that the annular structural element encloses the individual stator teeth in an annular manner, wherein at one or more points of the annular enclosure of at least one stator tooth, this enclosure is perforated by a recess.

12. The axial flux machine according to claim 11, wherein the recess is a slot-shaped recess.

13. The axial flux machine according to claim 1, wherein the annular structural element has a heat transfer device inserted in a positive locking manner, with an integrated working medium.

14. The axial flux machine according to claim 13, wherein the heat transfer device comprises a closed cavity with a medium with phase transition and/or a heat pipe.

15. The axial flux machine according to claim 1, wherein the annular structural element has at least one projection in the radial and/or axial direction, by means of which the cooling capacity of the annular structural element can be increased.

16. The axial flux machine according to claim 15, wherein the at least one projection has a cooling fin arranged adjacent to at least one of the coils.

17. The axial flux machine according to claim 1, wherein the annular structural element is configured as a positioning element at its outer and/or inner edge, so that the stator can be positioned via the annular structural element.

18. The axial flux machine according to claim 17, wherein the annular structural element has suitable fastening elements via which the stator can be fastened in and/or on the motor housing via the annular structural element.

19. The axial flux machine according to claim 18, wherein a bearing seat is provided on the structural element, via which the position of the rotational rotor axis is defined and/or axial forces can be absorbed.

20. The axial flux machine according to claim 18, wherein a bearing seat is provided on the structural element, via which the position of the rotational rotor axis is defined and/or axial forces of the rotor can be absorbed.

* * * * *